United States Patent [19]
Farquhar

[11] Patent Number: 5,546,976
[45] Date of Patent: Aug. 20, 1996

[54] CONDENSATE TRAP INSTALLATIONS

[75] Inventor: Keith Farquhar, Cheltenham, United Kingdom

[73] Assignee: Spirax-Sarco Limited, Gloucestershire, United Kingdom

[21] Appl. No.: 277,009

[22] Filed: Jul. 19, 1994

[30]     Foreign Application Priority Data

Jan. 12, 1994 [GB] United Kingdom .................. 9400496

[51] Int. Cl.[6] ....................................................... F16T 1/38
[52] U.S. Cl. ........................... 137/183; 137/544; 137/614; 137/614.2; 236/58; 285/31
[58] Field of Search ..................... 137/183, 544, 137/614, 614.2, 271; 236/58; 285/325, 368, 412, 31

[56]                References Cited

U.S. PATENT DOCUMENTS

| | | | |
|---|---|---|---|
| 1,657,173 | 1/1928 | Morrison | 137/614.2 X |
| 3,200,834 | 8/1965 | Pape | 137/183 |
| 3,516,688 | 6/1970 | Gachot | 285/31 |
| 3,643,983 | 2/1972 | Ludeman | 285/31 |
| 3,788,344 | 1/1974 | Dyck | 137/884 X |
| 4,306,587 | 12/1981 | Tchebinyayeff | 137/884 X |
| 4,350,181 | 9/1982 | Kreeley . | |
| 4,429,903 | 2/1984 | Baker | 285/368 X |
| 4,848,391 | 7/1989 | Miller et al. | 137/884 X |
| 5,316,213 | 5/1994 | Gooderham | 236/58 |

FOREIGN PATENT DOCUMENTS 1188711 4/1970 United Kingdom .

OTHER PUBLICATIONS

Search Report dated Feb. 21, 1994.
Search Report dated Mar. 16, 1993.

*Primary Examiner*—Gerald A. Michalsky
*Attorney, Agent, or Firm*—Willian Brinks Hofer Gilson & Lione

[57]                ABSTRACT

A condensate trap installation comprises a condensate trap 6 and one or more further components such as a strainer 8 and a check valve 10. The condensate trap 6 and the further components 8, 10 are placed in face-to-face engagement at end faces 30 and clamped together by a clamping device, comprising bolts 22 or comprising a carrier 60, which applies a compressive force by means of a clamping body 18 and a flange 20 provided respectively on pipe ends 2 and 4. An isolating valve 14 is provided to isolate the condensate trap 6 and the components 8, 10 so that they can be removed.

15 Claims, 4 Drawing Sheets

CONDENSATE TRAP INSTALLATIONS

BACKGROUND OF THE INVENTION

This invention relates to condensate trap installations situated in pipelines.

Condensate traps are commonly provided in steam lines for the purpose of discharging condensed water from the steam line while minimizing the escape of steam.

A steam trap typically comprises a housing which accommodates a valve and an actuator for opening and closing the valve in response to conditions in the steam line. The steam trap housing may also accommodate a strainer to prevent dirt from reaching the steam trap valve, and a check valve in order to prevent reverse flow through the steam trap. The steam trap itself is fitted in the steam line typically between flanges. Isolating valves may also be required in the steam line so that the steam trap can be isolated if it is to be removed for servicing or replacement.

SUMMARY OF THE INVENTION

According to the present invention, there is provided a pipeline including a condensate trap installation, the pipeline comprising two aligned pipe ends provided with respective coupling bodies having respectively oppositely disposed, parallel abutment faces between which the condensate trap installation is disposed, the condensate trap installation comprising a condensate valve and at least one further component, the condensate valve and the further component each comprising a housing having oppositely disposed parallel end faces which are parallel to the abutment faces of the coupling bodies, the condensate valve and the further component being clamped together at adjacent respective end faces by clamping means which extends between the coupling bodies and which exerts a compressive force at the axially outermost end surfaces of the condensate trap installation.

With such a construction, the clamping means not only supports the condensate trap and the further component with respect to each other, but also secures them with respect to the pipeline to which they are fitted. Consequently, by releasing the clamping means, the steam trap and the further component can be separated from each other and from the pipeline.

The further component may, for example, be a strainer or a check valve. There may be more than one further component and, in a preferred installation, a further component in the form of a strainer is provided on one side of the steam trap and a further component in the form of a check valve is provided on the other side.

The peripheries of the steam trap and the or each further component may be shaped with formations for engagement with the clamping bolts or for cooperation with the interior of the carrier, to align the condensate valve and the or each further component with one another.

One of the coupling bodies may be an isolating valve, and the other may be a flange.

The clamping means may comprise bolts which clamp the steam trap and the or each further component between the two coupling bodies.

In an alternative embodiment, the clamping means comprises a carrier which is independently releasably secured at each end to the respective coupling bodies.

The carrier preferably comprises two carrier members disposed on radially opposite sides of the condensate valve and the or each further component. Each carrier member preferably partially surrounds the condensate valve and the or each further component, and may have an opening for the passage, during assembly or dismantling of the condensate trap installation, of the condensate valve and the or each further component into and out of the carrier. In the assembled condition of the carrier, a fastener may extend across the opening. The interior of the carrier may be such that installation of the condensate valve and the or each further component is possible in one axial orientation only.

DETAILED DESCRIPTION OF THE INVENTION

Figure 1:
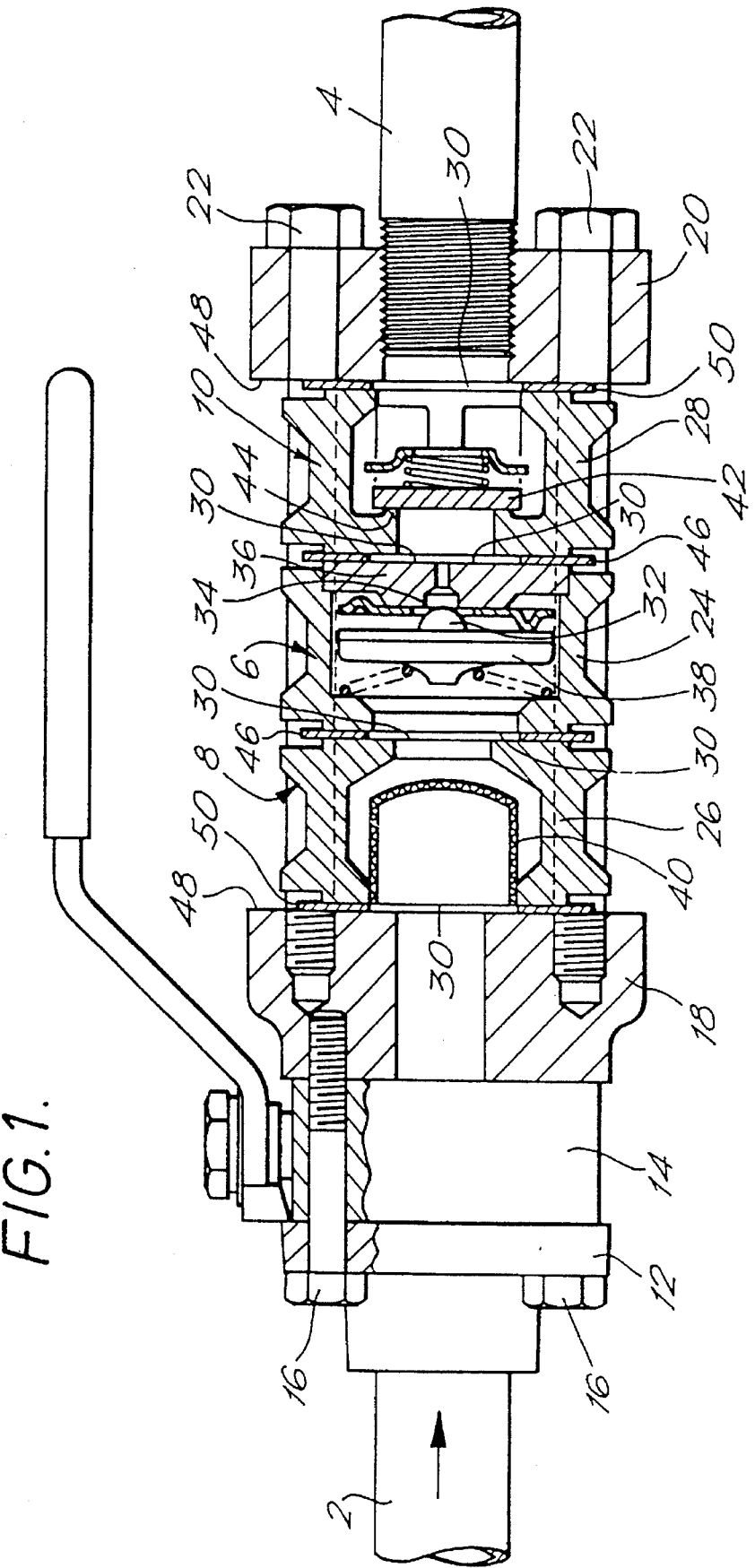
FIG. 1 shows a sectional view of a pipeline including a steam trap installation.

The pipeline shown in FIG. 1 comprises two pipe ends 2 and 4 between which is provided a condensate trap installation comprising a steam trap 6, a strainer 8 and a check valve 10.

A flange 12 is secured to the pipe end 2 and an isolating valve 14 in the form of a ball valve is secured to the flange 12 by bolts 16 which extend through the housing of the valve 14 into an end body 18. A flange 20 is secured to the pipe end 4, and clamping bolts 22 pass through the flange 20 into the clamping body 18. The clamping bolts 22 pass outside the steam trap 6 and the other components 8,10, and so form a cage surrounding them. The steam trap 6 and the other components 8,10 thus lack any provision for securing them together or to the pipeline. The steam trap 6, the strainer 8 and the check valve 10 each comprise a respective housing 24, 26, 28. Each housing has oppositely disposed parallel end faces 30. The housing 24 of the steam trap 6 accommodates a valve comprising a valve element 32 and a valve seat 34 formed in a wall 36 of the housing 24. An actuator 38 supports the valve element 32 for movement into and out of sealing contact with the seat 34.

The housing 26 of the strainer 8 accommodates a strainer element 40, and the housing 28 of the check valve 10 accommodates a spring-loaded check valve element 42 which cooperates with a seat 44.

The steam trap 6, the strainer 8 and the check valve 10 are clamped together at their adjacent end faces 30, by the bolts 22. Sealing is provided by gaskets 46. The outer end faces 30 of the strainer 8 and the check valve 10 are engaged by abutment faces 48 on the clamping body 18 and the flange 20, through gaskets 50.

As can be appreciated from the Figure, the outer peripheries of the housings 24, 26 and 28 have formations which accommodate the clamping bolts 22 and serve to align the steam trap 6, the strainer 8 and the check valve 10 and prevent their rotation relatively to each other once the clamping bolts 22 are installed.

Figure 2:
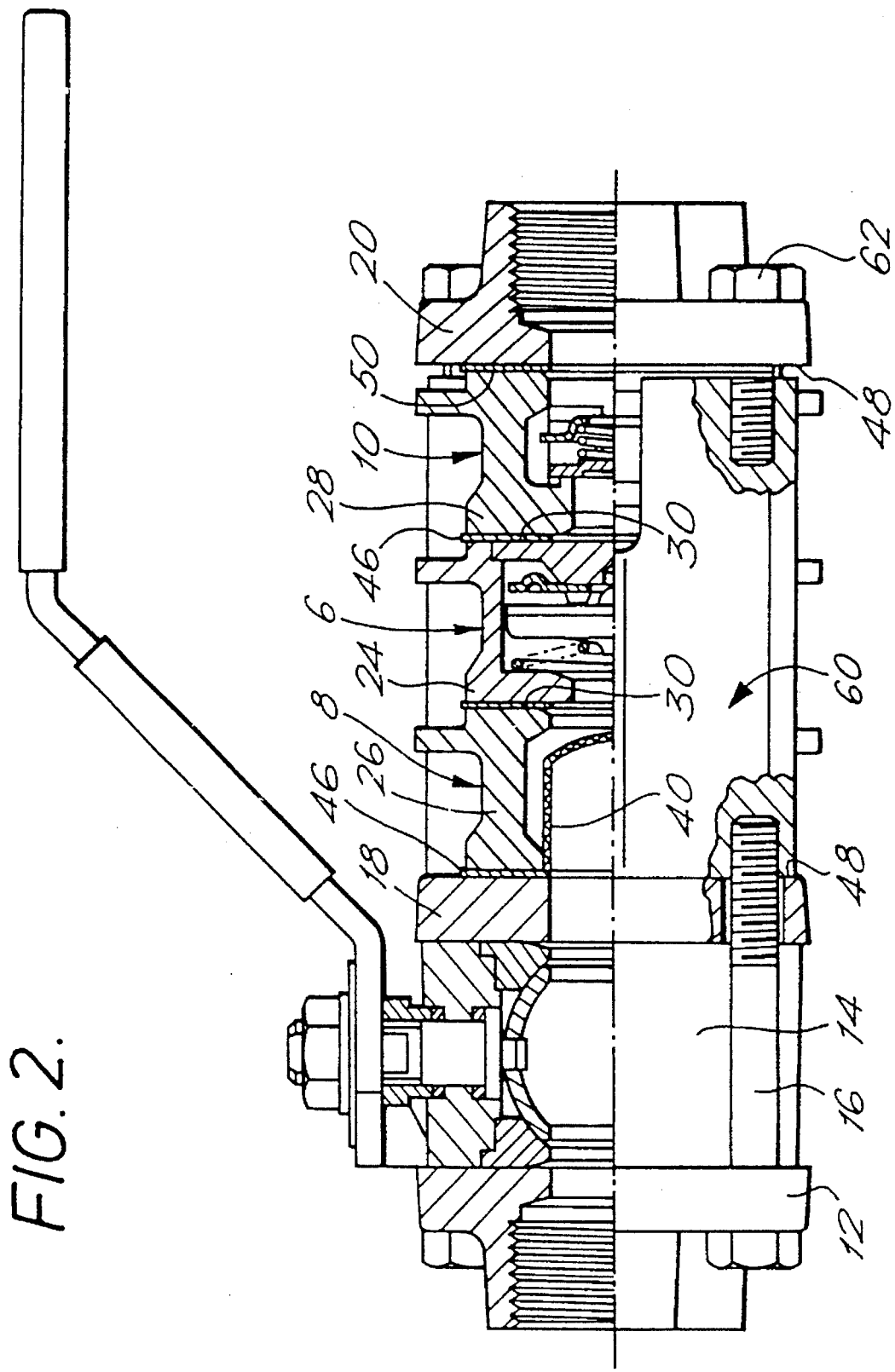
FIG. 2 shows a sectional view of an alternative steam trap installation.

The condensate trap installation shown in FIG. 2 shares several features with the installation shown in FIG. 1 and like components have been given the same reference numerals. However, the steam trap 6, strainer 8 and the check valve 10 are clamped together by a carrier 60. One end of the carrier 60 is secured to the clamping body 18 by the bolts 16. Thus, the bolts 16 pass through the valve 14 and through the clamping body 18 into one end of the carrier 60. The other end of the carrier 60 is secured to the flange 20 by clamping bolts 62 which pass through the flange 20 and into the other end of the carrier 60. The axial length of the carrier corresponds to the combined axial length of the components of the steam trap installation.

Figure 3:
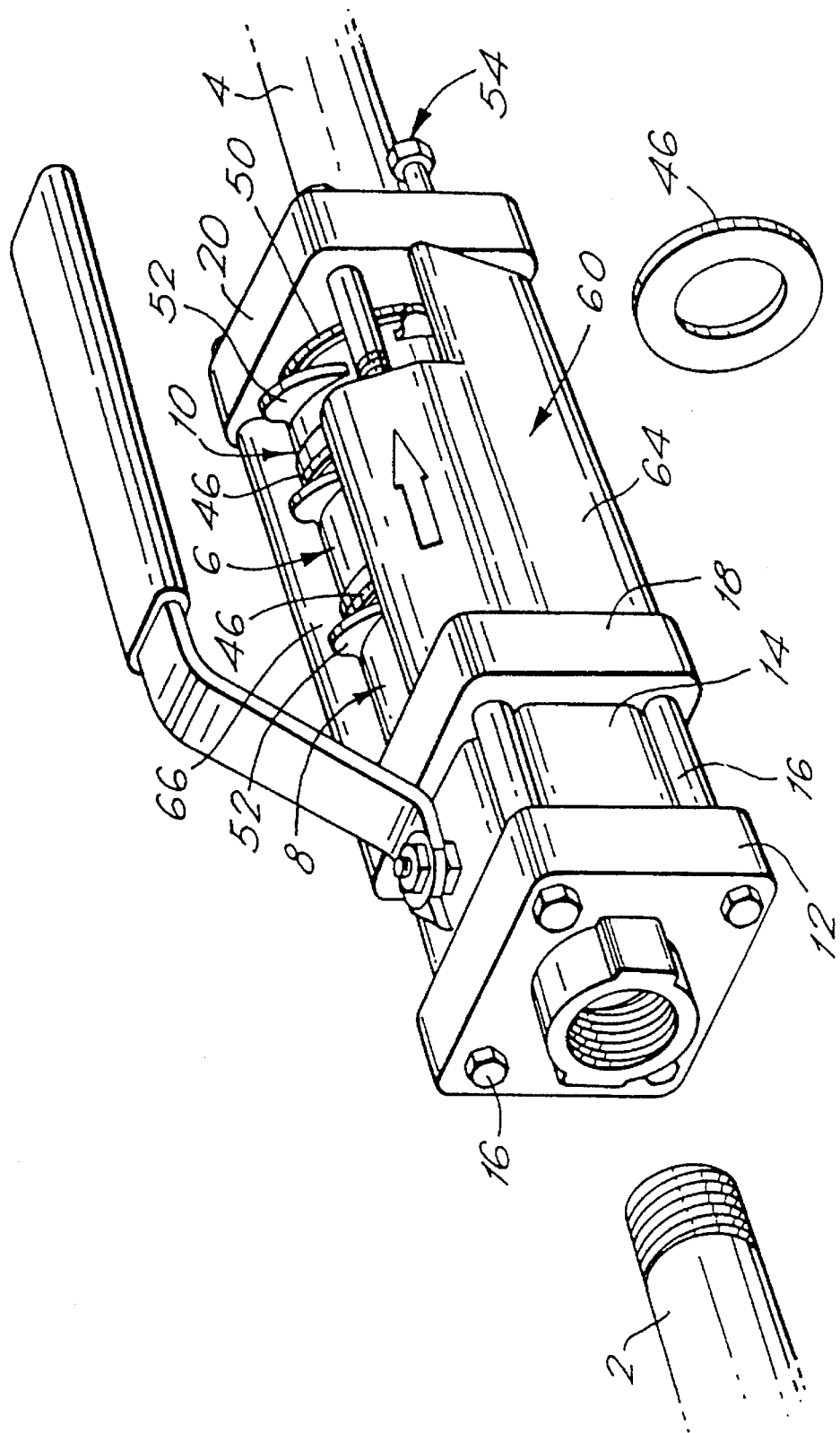
FIG. 3 is a perspective view of the installation of FIG. 2 mounted in a pipeline.

As can be seen in FIG. 3, the carrier 60 comprises two radially oppositely disposed carrier members 64, 66. Each carrier member 64, 66 partially surrounds the steam trap 6, strainer 8 and check valve 10. The steam trap 6, strainer 8 and check valve 10 are each provided with formations 52 which cooperate with the interior of the carrier to align the components with one another. A jacking device 54, in the form of a bolt which engages a threaded bore in the flange 20, may be provided to facilitate axial separation of the installation during dismantling.

Figure 4:
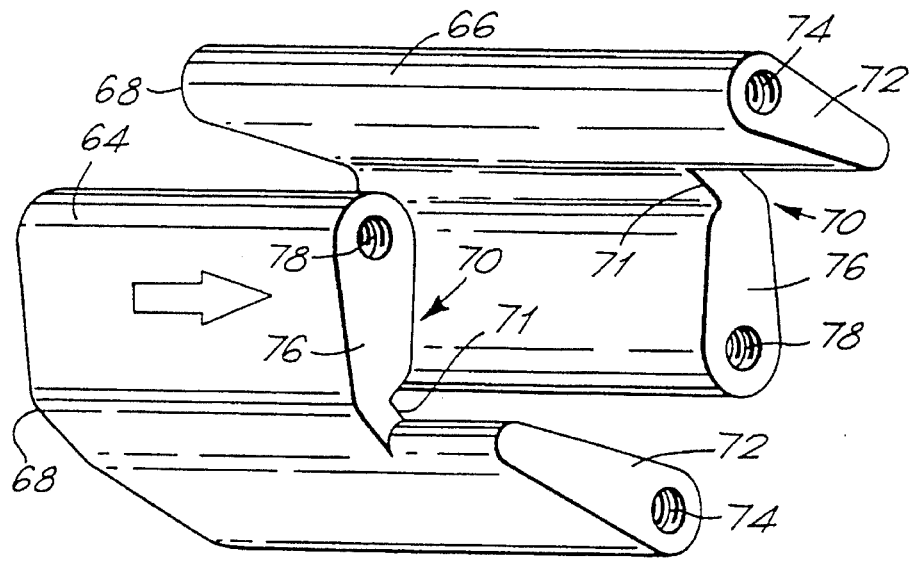
FIG. 4 shows the carrier of the installation of FIGS. 2 and 3.

As shown in FIG. 4, the two carrier members 64, 66 are identical to each other. Each member comprises two limbs which extend axially and which are joined along one side. The join between the two limbs defines an internal recess 71. One of the limbs is axially shorter than the other so as to define a stepped portion 70 at one axial end of each carrier member 64, 66. Each member comprises a first flat end surface 68 which abuts the clamping body 18. The end surface 68 has two threaded bores which receive the bolts 16, to clamp the respective carrier member 64, 66 to the clamping body 18. The other end of each carrier member 64, 66 has the stepped portion 70 which defines a lateral opening. The stepped portion defines a first partial end surface 72 (the end of one of the limbs) which has a threaded bore 74, and a second, parallel, partial end surface 76 (the end of the other limb) which is also provided with a respective threaded bore 78. The bores 74, 78 receive the clamping bolts 62.

Figure 5:
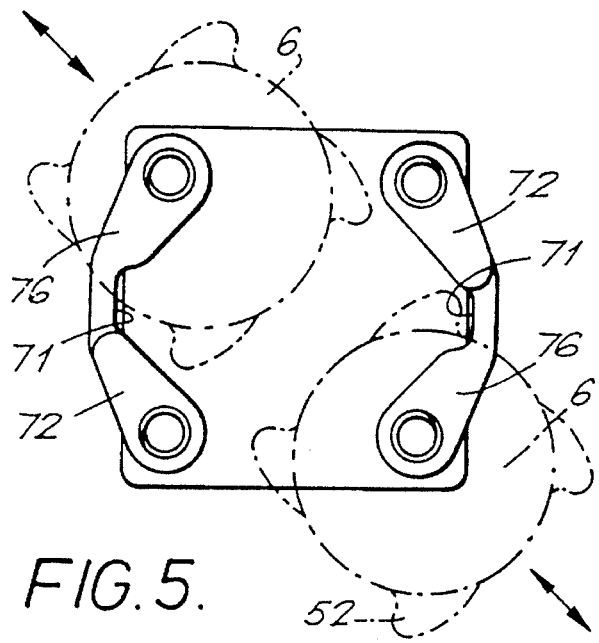
FIG. 5 shows an end view of the carrier of FIG. 4 and shows assembly of the installation.
Figure 6:
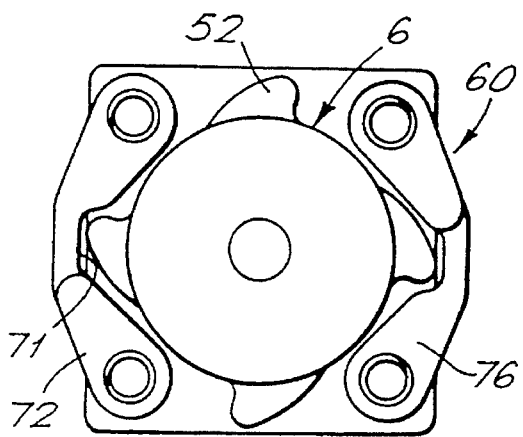
FIG. 6 corresponds to FIG. 5 but shows the installation in an assembled condition.

As can be seen in FIG. 5, the stepped portion 70 provides an opening which enables the condensate valve 6 (or other components) to pass into and out of the carrier. Once the condensate valve 6 has been positioned in the interior of the carrier 60, as in FIG. 6, it may be slid axially within the interior of the carrier. The formations 52 provided on the steam trap 6, strainer 8 and check valve 10 cooperate with the interior of the carrier 60 to align the three components with one another. Also, the formations 52 have a non-symmetrical shape, the formations 52 cooperating with the internal recesses 71 in such a way that the components may be slid axially within the interior of the carrier 60 in one axial orientation only. Thus, in the embodiment shown, the steam trap 6 and strainer 8 (which have been slid away from the openings) may be accommodated in the interior of the carrier 60 in the one axial orientation only.

Assembly of installation shown in FIGS. 2 to 6 involves securing the carrier to the clamping body 18 and then axially sliding the components within the interior of the carrier 60. Finally, the open end of the carrier 60 is secured to the flange 20 by the bolts 62. Those bolts which engage the threaded bores 78 extend across the openings defined by the stepped portions 70 to prevent the passage of the components through the openings when the installation is assembled. Thus, the bolts 62 ensure alignment of the components of the steam trap installation along the entire length of the carrier 60.

It will be appreciated that the modular construction of the installation enables the steam trap 6 to be combined with one or more further components, such as the strainer 8 and the check valve 10, in order to provide a combination of components appropriate to any particular purpose. Not only may different types of component be selected, but so may components of different characteristics. For example, the check valve 10 may be replaced by one requiring a different opening pressure. If any one or more of the steam trap and the other components 8 and 10 needs to be removed, for example for inspection, the isolating valve 14 is closed and, for the assembly shown in FIG. 1, the clamping bolts 22 are removed. The installation can then be separated into its components without the need to remove any other fasteners, and only that component requiring attention needs to be dismantled.

In order to remove any of the components of the steam trap assembly shown in FIGS. 2 to 6, the bolts 62 may be loosened in order to release the clamping force applied to the components and thereby enabling the components to slide relatively to each other. The gaskets of the installation may cause the joints of the components to become stuck together, and the jacking device 54, if provided, may be screwed in to apply a force causing separation of the flange 20 from the carrier 60. In this way, at least one of the gasket joints will be forced to separate. In order to remove components of the installation, only one of the bolts extending across the openings of the carrier members needs to be removed, and consequently the carrier 60 will remain in place during the removal of any of the components. In this way, the carrier facilitates dismantling of the components of the assembly and prevents parts falling to the ground when the clamping bolts 62 are loosened. The chosen component may be removed by advancing it axially to the openings provided in the carrier members 64, 66 and then passing the component through the selected opening (as shown in FIG. 5).

I claim:

1. A pipeline comprising:

first and second aligned pipe ends, the first pipe end being provided with a first coupling body and the second pipe end being provided with a second coupling body, each coupling body having an abutment face, the abutment faces being parallel and being oppositely disposed;

a condensate trap installation disposed between the abutment faces and having opposite outermost end surfaces, the condensate trap installation comprising a condensate valve and at least one further component, the condensate valve and the further component each comprising a housing having oppositely disposed parallel end faces which are parallel to the abutment faces of the coupling bodies, one of the end faces of the condensate valve being adjacent to one of the end faces of the further component; and clamping means which extends between the coupling bodies and which clamps together the condensate valve and the further component at the adjacent end faces, the clamping means exerting a compressive force at the axially outermost end surfaces of the condensate trap installation, the clamping means comprising a carrier which is independently releasably secured at each end to the respective coupling bodies and which, in the assembled condition, and before the application of the compressive force, retains the condensate valve and the further component in position between the abutment faces.

2. A pipeline as claimed in claim 1, in which the further component is selected from the set comprising a strainer and a check valve.

3. A pipeline as claimed in claim 1, in which the further component is one of a plurality of further components.

4. A pipeline as claimed in claim 1, in which the carrier comprises two carrier members disposed on radially opposite sides of the condensate valve and the further component.

5. A pipeline as claimed in claim 4, in which each carrier member extends between the coupling bodies and partially surrounds the condensate valve and the further component.

6. A pipeline as claimed in claim 5, in which at least one of the carrier members has an opening for the passage, during assembly or dismantling of the condensate trap installation, of the condensate valve and the further component in to and out of the carrier.

7. A pipeline as claimed in claim 6, in which the clamping means includes fasteners which extend through the respective coupling bodies to secure the carrier at each end to the respective coupling bodies, and in which, in the assembled condition, at least one of the fasteners extends across the opening.

8. A pipeline as claimed in claim 4, in which the carrier members are identical to each other.

9. A pipeline as claimed in claim 1 in which the peripheries of the condensate valve and the further component are provided with formations which cooperate with an interior of the carrier to align the condensate valve and the further component with one another.

10. A pipeline as claimed in claim 9, in which the shape of the formations and of the interior of the carrier is such that installation of the condensate valve and the further component is possible in one axial orientation only.

11. A pipeline as claimed in claim 1, in which one of the coupling bodies is an isolating valve.

12. A pipeline as claimed in claim 1, in which one of the coupling bodies is a flange.

13. A pipeline as claimed in claim 1, in which the crimping means includes fasteners which extend through the respective coupling bodies and engage the carrier to secure the carrier at each end to the respective coupling bodies.

14. A pipeline as claimed in claim 13, in which the fasteners comprise screwthreaded bolts which engage tapped bores in the carrier.

15. A pipeline as claimed in claim 13, in which the fasteners are equally distributed around the axis of the pipeline, the carrier comprising two carrier members disposed on radially opposite sides of the condensate trap installation, each carrier member extending circumferentially between two of the fasteners extending through each coupling body.

* * * * *